(12) United States Patent
Nauche et al.

(10) Patent No.: US 7,571,545 B2
(45) Date of Patent: Aug. 11, 2009

(54) CONTOUR READING DEVICE INCLUDING A FEELER MOBILE IN ROTATION

(75) Inventors: Michel Nauche, Soisy-Sous-Montmorency (FR); Ludovic Jouard, Charenton le Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 967 days.

(21) Appl. No.: 11/140,198

(22) Filed: May 31, 2005

(65) Prior Publication Data
US 2005/0275802 A1 Dec. 15, 2005

(30) Foreign Application Priority Data
May 28, 2004 (FR) .................................. 04 05818

(51) Int. Cl.
*G01B 5/20* (2006.01)
(52) U.S. Cl. ............................... 33/200; 33/28; 33/507; 33/549
(58) Field of Classification Search ................ 33/28, 33/200, 507, 549, 551, 553–556, 559, 572
See application file for complete search history.

(56) References Cited

U.S. PATENT DOCUMENTS

| 4,912,880 | A | * | 4/1990 | Haddock et al. ................ 451/5 |
| 4,991,305 | A | * | 2/1991 | Saigo et al. .................... 33/507 |
| 5,121,550 | A | | 6/1992 | Wood et al. .................... 33/551 |
| 6,618,952 | B2 | * | 9/2003 | Andrews et al. ............... 33/507 |
| 6,845,678 | B2 | * | 1/2005 | Igarashi et al. .............. 73/865.8 |
| 7,467,472 | B2 | * | 12/2008 | Jacq ............................. 33/200 |
| 2005/0275802 | A1 | * | 12/2005 | Nauche et al. ............... 351/177 |
| 2008/0022539 | A1 | * | 1/2008 | Haddadi ....................... 33/200 |

FOREIGN PATENT DOCUMENTS

EP     1 353 215     10/2003

* cited by examiner

*Primary Examiner*—Amy Cohen Johnson
(74) *Attorney, Agent, or Firm*—Young & Thompson

(57) ABSTRACT

Contour reading device, in particular for eyeglass frame rims, including a carrier axis (A) projecting transversely to the surface of a turntable (6), a carrier arm (18) which is mounted at one end to turn about the carrier axis (A) and at the other end of which a feeler (8) is mounted, whereby the feeler (8) is mobile relative to the turntable (6) along a circular arc path centered on the carrier axis (A).

24 Claims, 7 Drawing Sheets

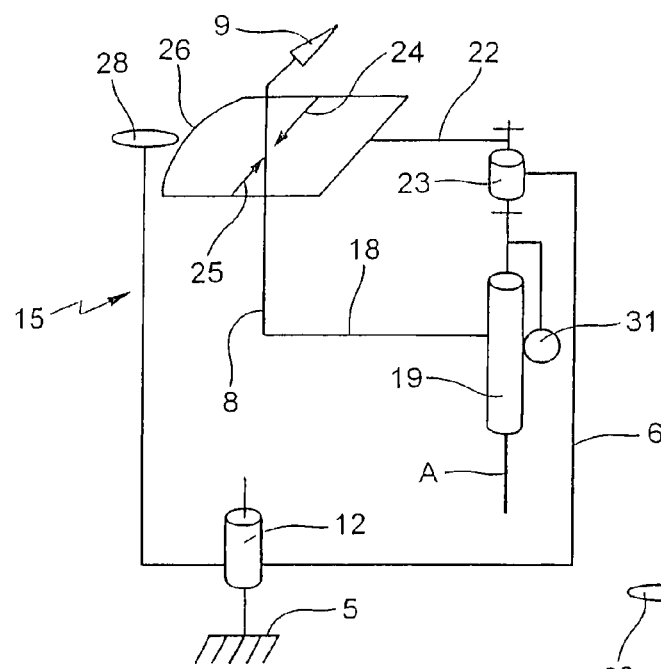
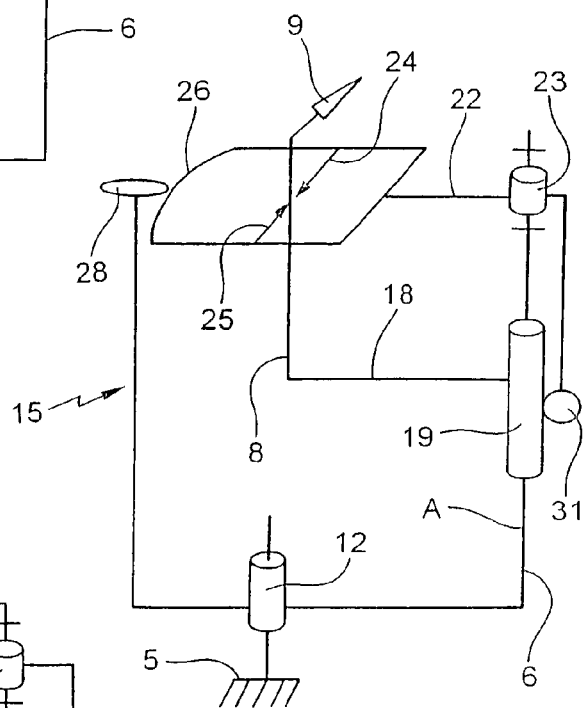
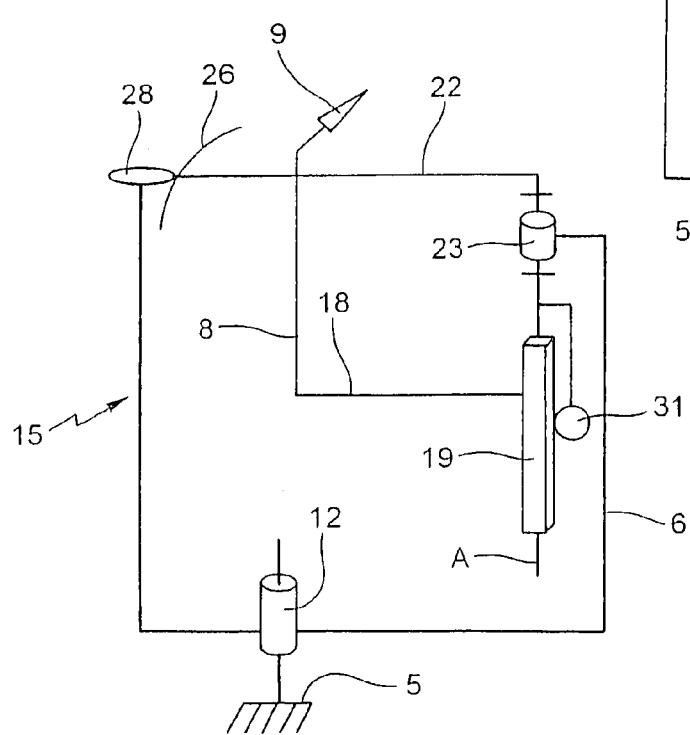
Fig.7
Fig.8
Fig.9

CONTOUR READING DEVICE INCLUDING A FEELER MOBILE IN ROTATION

The invention concerns the general field of dimensional measuring devices used in the fabrication of eyeglasses adapted to a particular wearer.

The invention is more particularly concerned with a contour reading device adapted to determine the shape of an element disposed on a support with the aid of a feeler. The palpated element is generally an eyeglass frame rim or an ophthalmic lens template.

This kind of device is used, for example, to determine the shape of the bezel of a frame rim, i.e. of the groove that runs around the inside of the frame rim and enables an ophthalmic lens to be fitted into the frame rim. To this end, the feeler is inserted into the bezel and measures the coordinates of a certain number of points it travels over in order to store a digital image of the profile of the bezel. A raw ophthalmic lens may then be trimmed to the dimensions of the bezel and fit perfectly into the frame rim.

The document FR 2 652 893 discloses a contour reading device of the above kind including a supporting table provided with means for holding the object to be palpated. A circular turntable rotatable relative to the supporting table supports a slideway on which is mounted a mobile carriage attached to a feeler.

The above device is intended in particular to measure contours in polar coordinates, i.e. the angular position of the circular turntable and the position of the carriage on the slideway are measured at each palpated point whose coordinates are to be defined.

The document U.S. Pat. No. 5,121,550 discloses a contour measuring device including a turntable rotatable relative to a support and a feeler mounted so that it is able to move in rectilinear translation along a slideway mounted on the turntable and in vertical translation relative to said carriage.

The device described can therefore work in cylindrical coordinates whose angular dimension ($\theta$) corresponds to the rotation of the turntable, whose radial dimension ($\rho$) corresponds to the movement in translation of the carriage on the slideway, and whose height (Z) corresponds to the vertical movement of the feeler. The feeler moves in the bottom of the bezel of the rim and remains in contact therewith because a radial force is applied to hold the feeler against the bezel.

The document U.S. Pat. No. 6,243,960 discloses a device for measuring the contour of the rims of an eyeglass frame, the device including an actuator provided with a rotation device on which is mounted a pivot mechanism supporting the feeler and enabling the latter to measure a contour by virtue of a rotation movement combined with a pivoting movement about an axis transverse to the axis of the rotation device.

The object of the invention is to improve the above type of contour reading device.

To this end, the invention provides a contour reading device, in particular for eyeglass frame rims, including a support for holding an article whose contour is to be read and a turntable that is rotatable relative to the support about a rotation axis and carries a reading subassembly that includes a feeler mobile in a direction parallel to the rotation axis of the turntable and in a plane transverse to the rotation axis of the turntable, which reading device is characterized in that the reading subassembly further includes:

a protruding carrier axis transverse to the surface of the turntable, a carrier arm which is mounted at one end to turn about said carrier axis and at the other end of which said feeler is mounted, whereby the feeler is mobile relative to the turntable along a circular arc path centered on said carrier axis.

The above kind of reading device is adapted to control movement of the feeler in rotation about the axis of the turntable, in rotation about an axis offset relative to the axis of the turntable and in translation along an axis parallel to the axis of the turntable.

This combination of two rotations makes the reading subassembly more reliable and reduces its cost.

Moreover, the feeler is offset relative to the axis about which it moves in the plane transverse to the rotation axis of the turntable. Thus dust and dirt that may drop into the reading subassembly in line with the feeler have no effect on the mobile parts.

Nevertheless, to protect the reading subassembly effectively, the turntable may have on its surface a semicircular slot centered on the carrier axis and the carrier arm may be disposed so that the feeler passes through the semicircular slot.

Thus the carrier arm is adapted so that the drive means face the semicircular slot regardless of the angular position of the carrier arm about the carrier axis.

The semicircular slot may extend between the rotation center of the turntable and its periphery.

In one embodiment of the invention, the carrier arm cooperates with angular drive means adapted to drive the movement of the feeler in said plane transverse to the rotation axis of the turntable.

Thus the movement of the feeler in the plane transverse to the rotation axis of the turntable may be controlled.

Moreover, the angular drive means may include a guide arm one end of which is centered on the carrier axis and the other end of which includes drive means cooperating with the combination of the feeler and the carrier arm.

The above control means provide on-board guidance of the feeler.

The driving of the feeler by the guide arm may be effected by means of a rolling bearing and/or a fixed bearing.

The guide arm may advantageously be centered on the carrier axis by means of a rolling bearing.

Moreover, the guide arm may have a semicircular portion centered on the carrier axis. An angular drive motor may cooperate with said semicircular portion to drive rotation of the guide arm about the carrier axis.

The above features reduce the cost of motorization of the guide arm, as the semicircular portion can be toothed and mesh with a pinion of the angular drive motor.

Alternatively, the semicircular portion may be toothed and mesh with an intermediate pinion which itself meshes with a pinion of the angular drive motor. Thus the body of the motor is disengaged from the other mobile portions of the reading subassembly.

To effect the position measurements necessary for palpating the contour, the contour reading device may further include an encoder cooperating with the guide arm to measure the angular position of the guide arm about the carrier axis.

According to a preferred feature of the invention, the carrier arm cooperates with axial drive means adapted to drive the movement of the feeler in said direction parallel to the rotation axis of the turntable. The carrier arm therefore combines the movements of the feeler in a parallel direction and in a plane transverse to the rotation axis of the turntable.

According to another preferred feature of the invention, the axial drive means include an axial drive motor adapted to move the carrier arm along the carrier axis. The single guidance provided by the carrier axis therefore enables two different movements of the feeler thanks to a pivoting-sliding connection between the carrier arm and the carrier axis.

This further improves reliability as well as reducing fabrication costs.

The axial drive motor advantageously includes a pinion meshing with a rack fastened to a ring attached to the carrier arm and surrounding the carrier axis.

Moreover, the movement of the feeler may be servocontrolled. To this end, the axial drive motor is adapted to position the carrier arm along the carrier axis in accordance with a varying set point, so as to servocontrol the movement of the feeler along an axis parallel to the axis of rotation of the turntable, tracing the shape of the palpated profile.

For more precise measurements, the axial drive motor is adapted to compensate the force of gravity. To this end the axial drive motor is controlled to exert a continuous force that is equal and opposite to the force of gravity applied to the combination of the carrier arm and the feeler.

Moreover, the axial drive motor may be mounted on the guide arm to provide on-board motorization.

Also to effect the position measurements necessary for palpation, the contour reading device may further include an encoder cooperating with the carrier arm to indicate the axial position of the carrier arm along the carrier axis.

A simple and efficient solution for defining the carrier axis is a shaft fixed perpendicularly to the surface of the turntable.

The shaft may have a prismatic cross section adapted to drive the carrier arm in rotation about the carrier axis.

The feeler, the carrier axis and the rotation axis of the turntable are advantageously parallel.

In one embodiment of the invention the carrier arm is centered on the carrier axis by means of a ball bush enabling movement in translation and rotation of the carrier arm relative to the carrier axis.

The above kind of ball bush provides a sliding pivot at lower cost.

With regard to the rotation movement of the reading subassembly, the turntable may be adapted to be guided in rotation by rollers and where applicable to be driven thereby.

Alternatively, the turntable may be adapted to be driven in rotation by a pinion meshing with a circular rack fixed to the perimeter of the turntable.

Other features and advantages of the invention will become apparent in the light of the following description of a preferred embodiment of the invention that is described by way of nonlimiting example and with reference to the appended drawings, in which:

FIG. 7 is a kinematic diagram representing the components of the reading subassembly and their interconnections;

FIG. 8 is a view similar to FIG. 7 of a different embodiment of the invention; and FIG. 9 is a view similar to FIG. 8 of a further embodiment of the invention.

Figure 1:
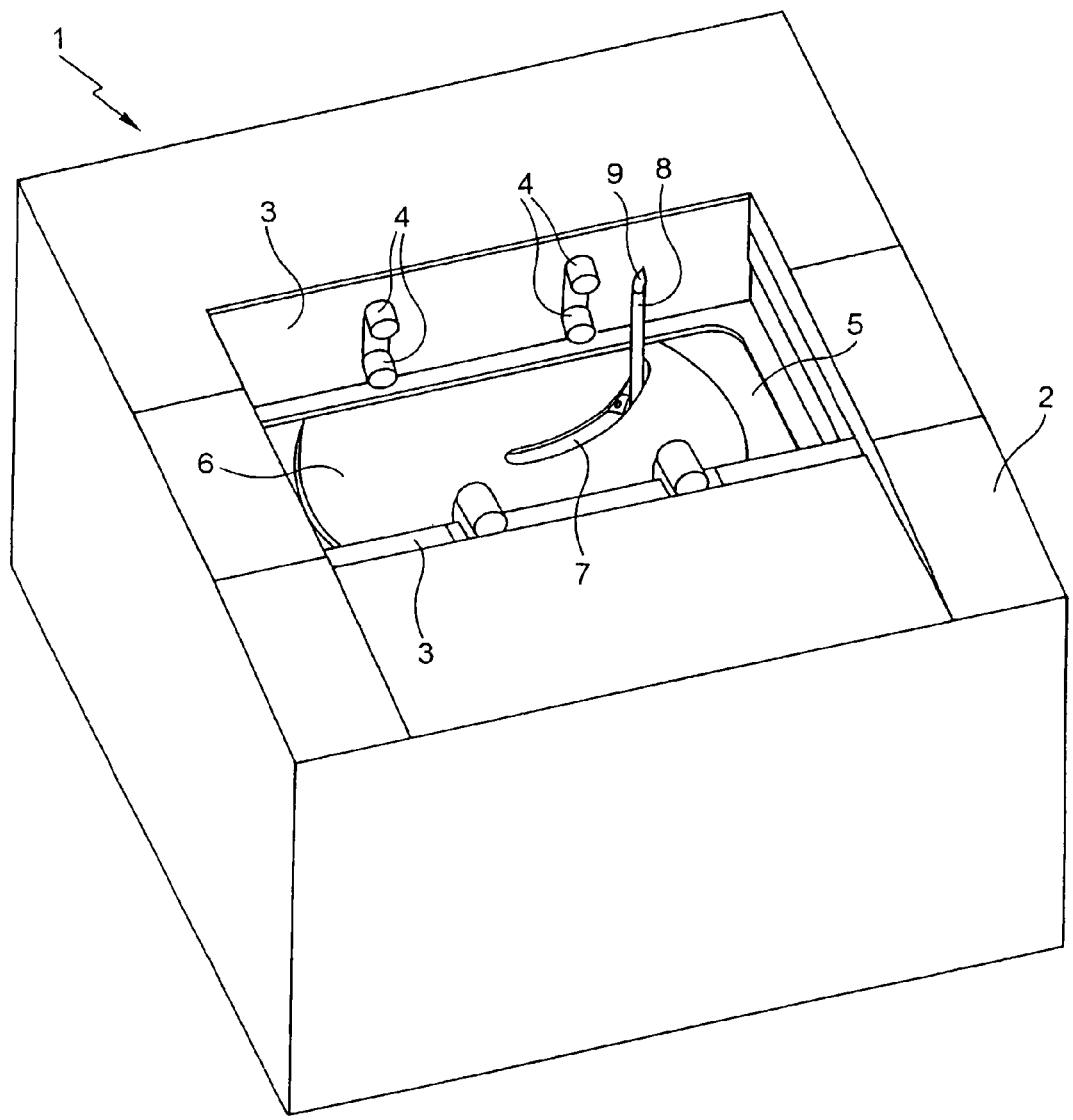
FIG. 1 is a perspective view of a contour reading device of the invention.

FIG. 1 is a general view of a contour reading device 1 as seen by its user. The device 1 includes a top cover 2 covering the whole of the device except for a top center portion thereof.

The device 1 also includes a set of two jaws 3 of which at least one jaw 3 is mobile relative to the other so that the jaws 3 can be moved towards each other or away from each other and form a clamping device. Each of the jaws 3 is further provided with two clamps each formed of two mobile studs 4 adapted to clamp a part between them.

A chassis 5 can be seen in the space left visible by the top central opening of the cover 2. A turntable 6 rotates relative to the chassis 5. The turntable 6 includes an oblong slot 7 of circular arc shape through which projects a feeler 8 provided with a palpation tip 9 at its end.

Figure 2:
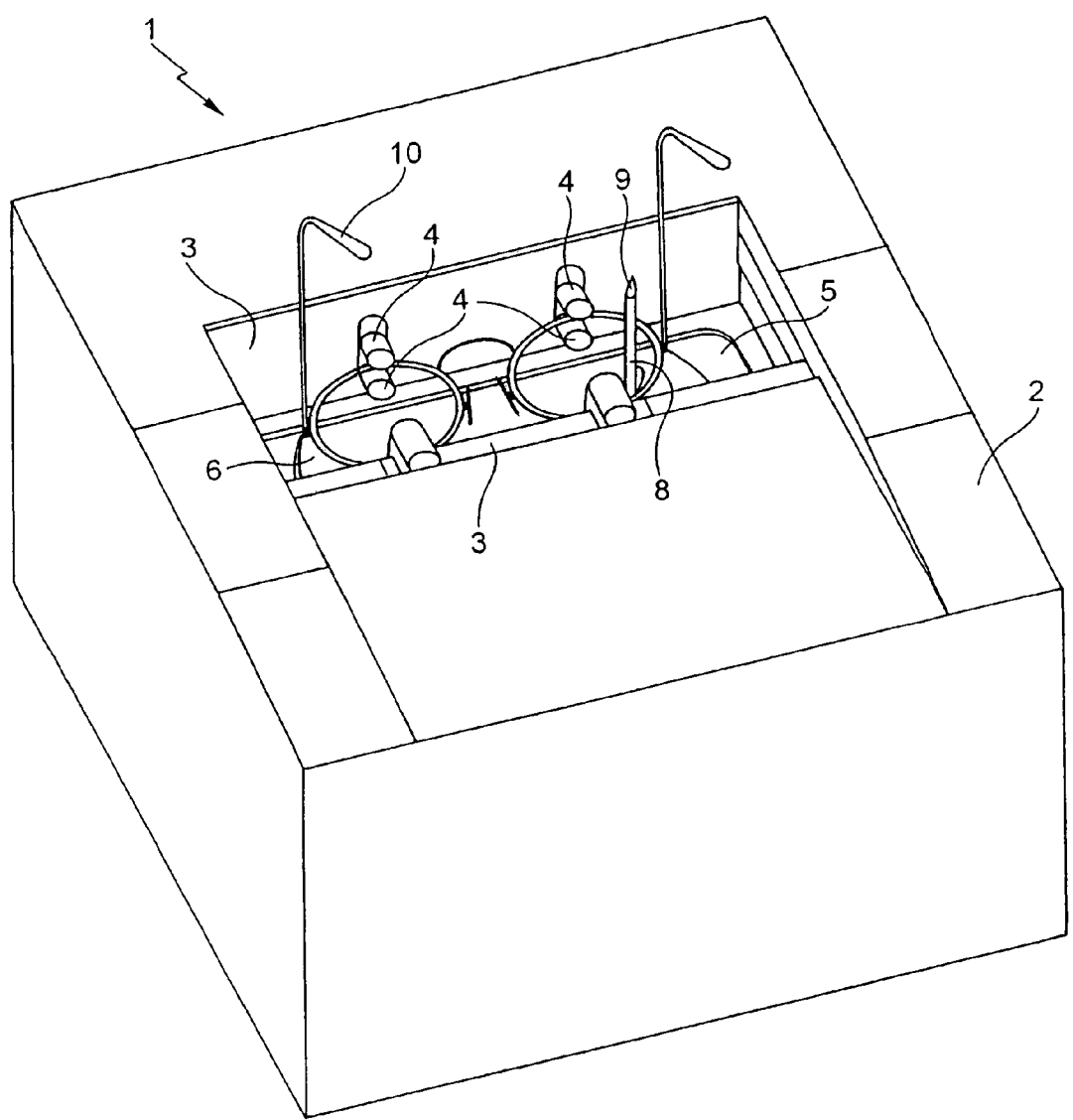
FIG. 2 is similar to FIG. 1 and shows the contour reading device receiving an eyeglass frame whose rim shape is to be measured by the feeler.

The FIG. 1 device 1 is adapted to receive a frame 10 in the manner shown in FIG. 2.

In FIG. 2, the jaws 3 have been moved toward each other to hold the frame 10 horizontally and the clamps formed by the studs 4 have been closed onto the frame rims. Thus each frame rim 10 is ready to be palpated along a path that is started by inserting the feeler between two studs 4 and then moving it along the bezel of the frame 10 to cover the whole circumference of the frame rim.

Note that in the present example the machine 1 is equipped with jaws adapted to hold a frame but that any other clamping device may be employed, for example a clamp for holding an ophthalmic lens template whose external contour is to be measured.

Figure 3:
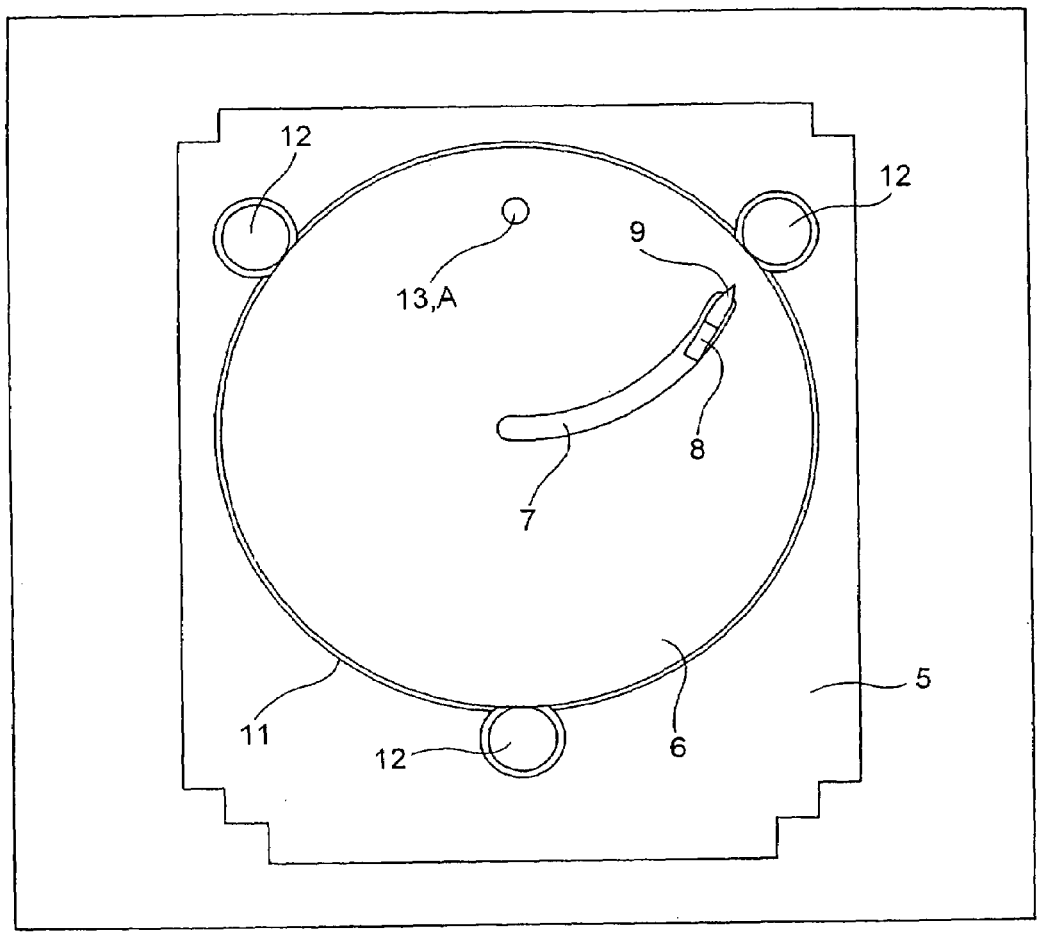
FIG. 3 is a top view of the FIG. 1 device with the top covers removed.

FIG. 3 shows the machine 1 as seen from above with the cover 2 removed. The chassis 5 takes the form of a support table in which there is a circular cut-out 11 of slightly greater diameter than the turntable 6. The circular cut-out 11 receives the turntable 6, which is guided by three guide rollers 12 distributed at regular intervals along its periphery.

Alternatively, the rollers 12 are driven by a motor-encoder (not shown) enabling controlled rotation of the turntable 6 and measurement of its instantaneous angular position.

FIG. 3 shows that, in the present example, the circular arc shaped slot 7 has a length approximately corresponding to the radius of the turntable 6 and extends between the center of the turntable 6 and its periphery.

The slot 7 is centered on a carrier axis A indicated in FIG. 3 by a rivet 13.

Figure 4:
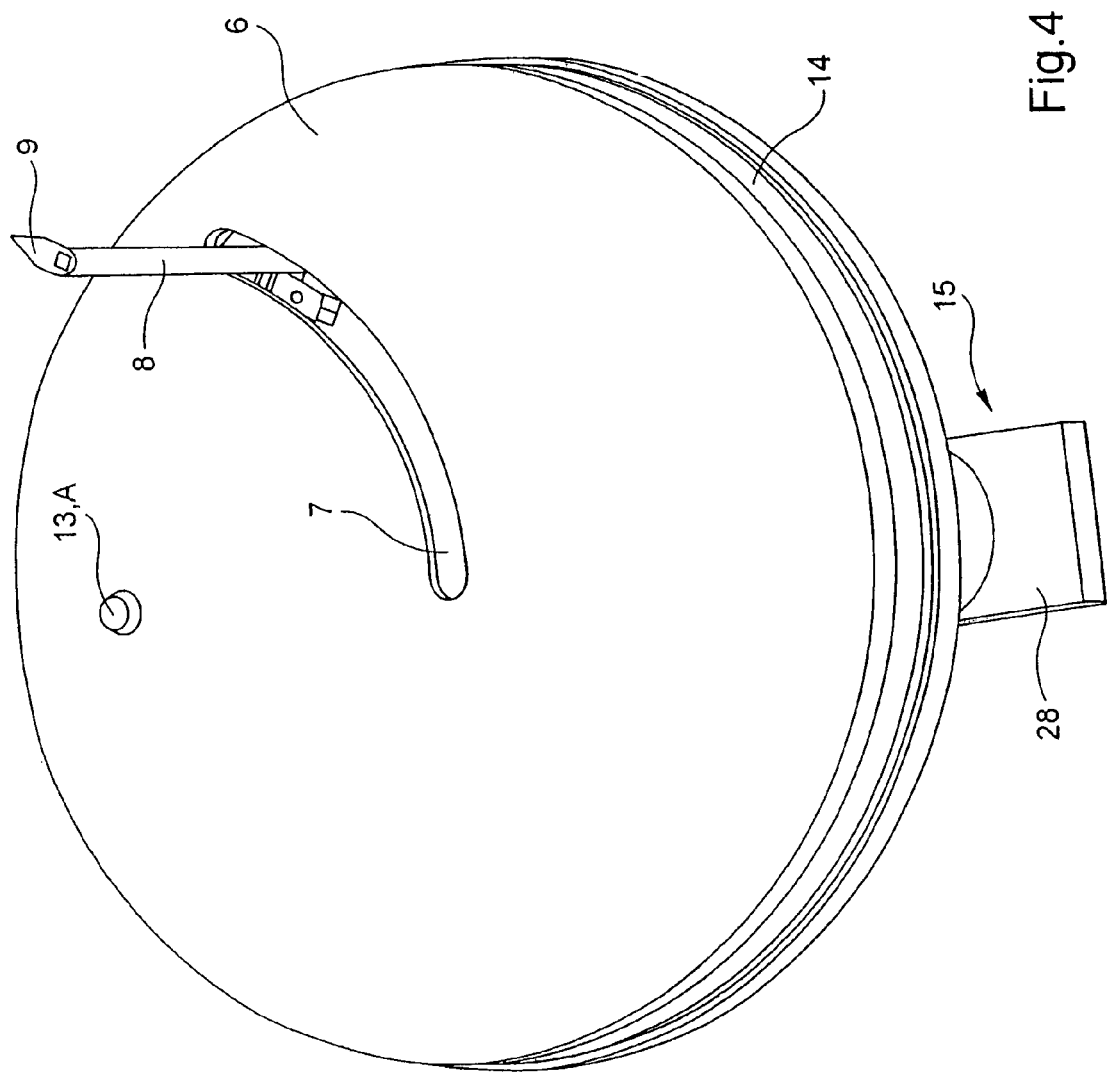
FIG. 4 is a perspective view of the turntable removed from the FIG. 1 device.

After demounting the device 1, the turntable 6 may be removed from the chassis 5. FIG. 4 shows how it then looks.

The FIG. 4 perspective view reveals a groove 14 on the edge of the turntable 6, around the whole of its circumference. The groove 14 allows retention and driving of the turntable 6 relative to the chassis 5 by means of the motorized rollers 12. The turntable 6 carries a reading subassembly 15 that is concealed by the surface of the turntable 6 and of which only a portion is visible in FIG. 4.

Figure 5:
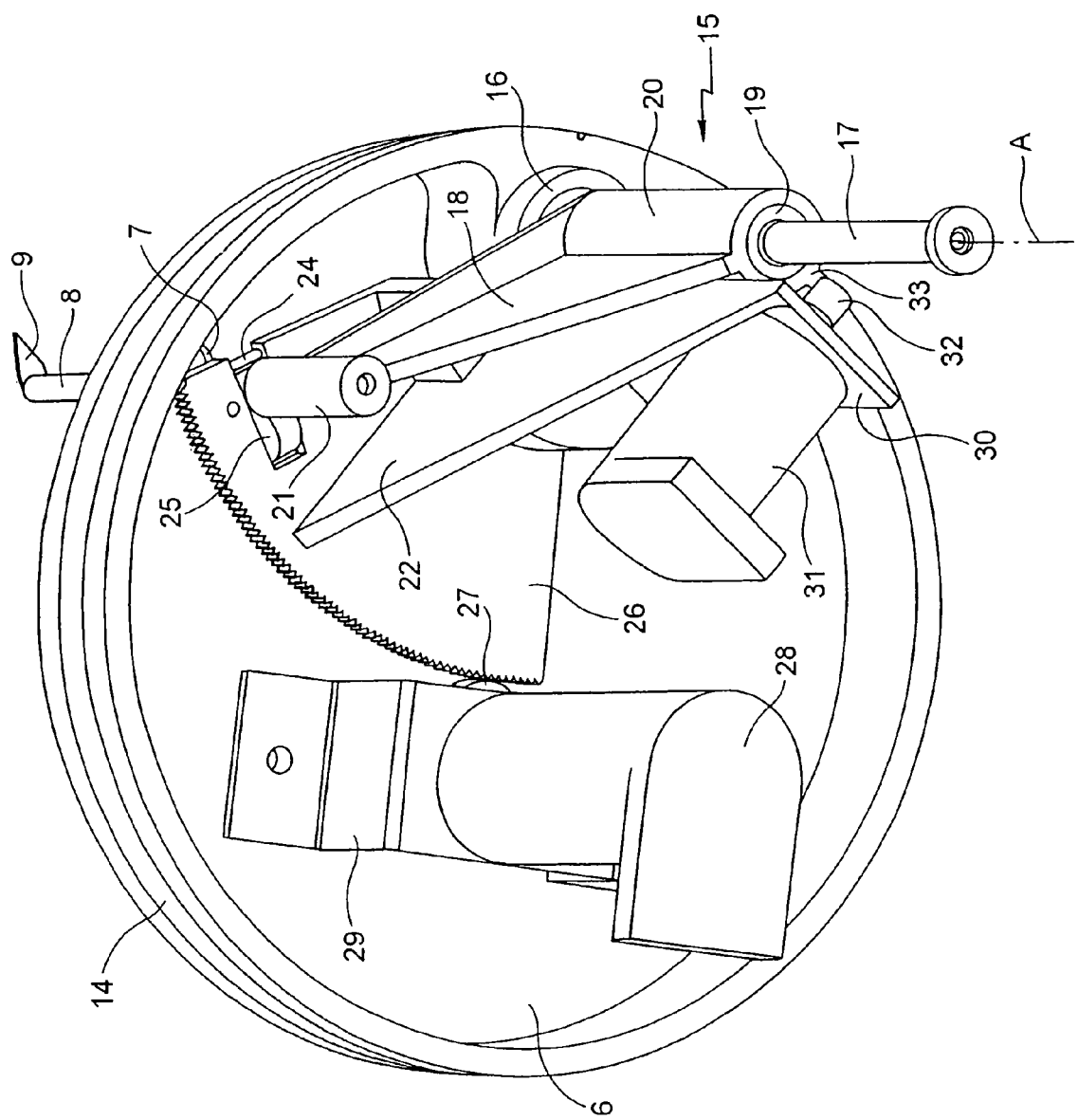
FIGS. 5 and 6 are perspective bottom views of the FIG. 4 turntable, showing the reading subassembly carried by the turntable from two different angles.
Figure 6:
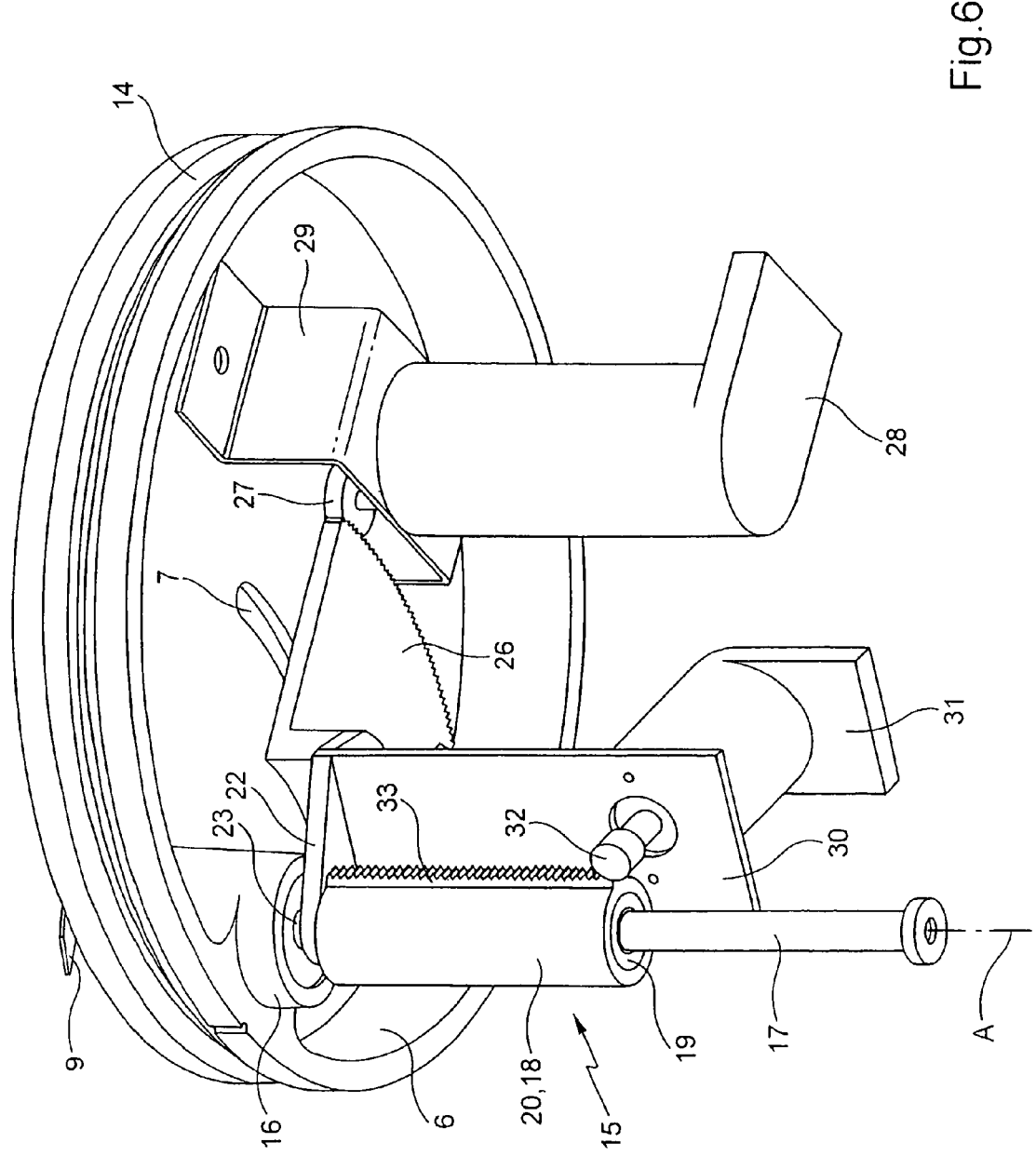

FIGS. 5 and 6 show the turntable 6 turned over relative to its position in FIG. 4. These two figures show the reading subassembly 15 from two different angles.

The reading subassembly 15 includes a bearing 16 on which is mounted a carrier shaft 17 rotatably mounted on the turntable 6 by means of the bearing 23. The shaft 17 therefore defines a carrier axis A.

Referring to FIG. 5, a carrier arm 18 is mounted on the carrier shaft 17 by means of a ball bush 19. The carrier arm 18 has at one end a ring 20 surrounding the ball bush 19 and the carrier shaft 17, the ball bush 19 allowing the carrier arm 18 to rotate about the axis A and to move in translation along that axis.

At the end opposite the ring 20, the carrier arm 18 has a cylindrical support 21 to which the feeler 8 is fixed so that it is parallel to the carrier shaft 17.

This allows movement of the feeler 8 along the slot 7 in a circular arc and in a plane transverse to the rotation axis of the turntable 6, which rotation axis is parallel to the axis A in the present example. Moreover, the feeler 8 may effect an entry/exit movement relative to the surface of the turntable 6 when the carrier arm 18 slides along the axis A.

The reading subassembly 15 also includes a guide arm 22 attached to the base of the shaft 17. The guide arm 22 is long enough to reach the slot 7 and includes a fixed bearing 24 and a rolling bearing 25 facing the slot 7.

The fixed bearing 24 and the rolling bearing 25 are disposed side by side with a distance between them substantially corresponding to the diameter of the feeler 8.

Because of the rotatable mounting of the assembly formed by the carrier shaft 17 and the guide arm 22 on the turntable 6, the fixed bearing 24 and the rolling bearing 25 remain facing the slot 7 regardless of the angular position of the guide arm 22 about the axis A. The carrier arm 18 and the guide arm 22 are disposed so that the feeler 8 is gripped between the fixed bearing 24 and the rolling bearing 25. The angular movements of the carrier arm 18 and the guide arm 22 about the axis A are therefore effected conjointly.

The guide arm 22 also has a toothed semicircular portion 26 centered on the axis A. The teeth of the semicircular portion 26 mesh with an intermediate pinion 27 that in turn meshes with the pinion (not visible) of a motor-encoder 28 mounted on a yoke 29 that is fixed to the turntable 6. To clarify the drawings the teeth of the intermediate pinion 27 are not shown.

The guide arm 22 further includes a vertical yoke 30 disposed parallel to the axis A and to which is fixed a motor-encoder 31 whose pinion 32 meshes with a rack 33 fixed to the ring 20 of the carrier arm 18. The rack 33 is parallel to the axis A. For the same reasons of clarification as before, the teeth of the pinion 32 are not shown. FIG. 7 is a diagram of the permitted relative movements of the various components of the reading subassembly 15 and indicates possible movements of the feeler when the device 1 is functioning.

The FIG. 7 diagrammatic components are identified by the same reference numbers as the real components to which they respectively correspond, which have already been described.

Thus the rollers 12 are able to pivot the reading subassembly 15 onboard the turntable 6 relative to the fixed chassis 5.

The guide arm 22 and the carrier arm 18 can also rotate conjointly about the axis A, which allows the guide arm 22, driven by the motor 28, to drive the feeler 8 in rotation about the axis A, along the slot 7. The fixed bearing 24 allows the carrier arm 18 to be driven in one of its rotation directions and the rolling bearing 25 allows it to be driven in the other rotation direction. An operating clearance may be provided between the feeler 8 and the components 24, 25 surrounding it, as indicated in FIG. 7.

Alternatively, the guide arm 22 may be rotatably mounted on the shaft 17, as indicated in FIG. 8.

Whereas the guide arm 22 is assigned to driving rotation of the feeler 8 about the axis A, the reading subassembly 15 has an onboard mechanism allowing simultaneous movement of the feeler 8 parallel to the axis A. The motor 31 is adapted to place the ring 20, and therefore the carrier arm 18, at the required height on the shaft 17.

Reading a contour may begin by placing the feeler tip 9 against the contour, the motor 31 moving it to the required height and contact being maintained between the tip 9 and the contour by the motor 28, which is controlled so that the feeler exerts a constant contact pressure against the contour.

The rollers 12 are then driven so that the turntable 6 performs one complete turn corresponding to one complete journey around the contour to be palpated. The motor-encoder 31 is passive during this rotation and serves only as an encoder to identify the successive positions of the carrier arm 18 along the axis A, corresponding to the height of the tip 9 relative to the turntable 6, as the tip 9 traces the shape in which it is engaged.

Alternatively, the motor 31, instead of being passive, may exert a constant torque on the bush 20 to reduce artificially the weight of the assembly formed by the carrier arm 18 and the feeler 8. This gravity compensation facilitates tracing of the contour to be palpated, which makes measurement more accurate.

Another alternative is to servocontrol the position of the carrier arm 18 along the axis A while tracing the contour. The motor 31 is therefore not passive, but receives continuously a set point that is varied as a function of the evolution of the contour or of the forces applied to the feeler 8.

Variants of the device 1 may be envisaged that do not depart from the scope of the invention. In particular, the carrier arm 18 may be driven in rotation about the axis A by direct action on the ring 20 and the guide arm 22 may be eliminated (see FIG. 9).

The invention claimed is:

1. Contour reading device (1), in particular for eyeglass frame (10) rims, including a support (3, 4) for holding an article whose contour is to be read and a turntable (6) that is rotatable relative to the support (3, 4) about a rotation axis and carries a reading subassembly (15) that includes a feeler (8) mobile in a direction parallel to the rotation axis of the turntable (6) and in a plane transverse to the rotation axis of the turntable (6), which reading device (1) is characterized in that the reading subassembly (15) further includes:

a rotation axis (A) referred to as the carrier axis transverse to the surface of the turntable (6), a carrier arm (18) which is mounted at one end to turn about said carrier axis (A) and at the other end of which said feeler (8) is mounted, whereby the feeler (8) is mobile relative to the turntable (6) along a circular arc path centered on said carrier axis (A).

2. Contour reading device according to claim 1, characterized in that the turntable (6) has on its surface a semicircular slot (7) centered on the carrier axis (A) and the carrier arm (18) is disposed so that the feeler (8) passes through the semicircular slot (7).

3. Contour reading device according to claim 1, characterized in that the semicircular slot (7) extends between the rotation center of the turntable (6) and its periphery.

4. Contour reading device according to claim 1, characterized in that the carrier arm (18) cooperates with angular drive means adapted to drive the movement of the feeler (8) in said plane transverse to the rotation axis of the turntable (6).

5. Contour reading device according to claim 4, characterized in that the angular drive means include a guide arm (22) one end of which is centered on the carrier axis (A) and the other end of which includes drive means cooperating with the combination of the feeler (8) and the carrier arm (18).

6. Contour reading device according to claim 5, characterized in that the drive means include a rolling bearing (25).

7. Contour reading device according to claim 5, characterized in that the drive means include a fixed bearing (24).

8. Contour reading device according to claim 5, characterized in that the guide arm (22) is centered on the carrier axis (A) by means of a rolling bearing (23).

9. Contour reading device according to claim 5, characterized in that the guide arm (22) has a semicircular portion (26) centered on the carrier axis (A).

10. Contour reading device according to claim 9, characterized in that it further includes an angular drive motor (28) cooperating with said semicircular portion (26) to drive rotation of the guide arm (22) about the carrier axis (A).

11. Contour reading device according to claim 10, characterized in that the semicircular portion (26) is toothed and meshes with a pinion of the angular drive motor (28).

12. Contour reading device according to claim 10, characterized in that the semicircular portion (26) is toothed and meshes with an intermediate pinion (27) that meshes with a pinion of the angular drive motor (28).

13. Contour reading device according to claim 5, characterized in that it further includes an encoder (28) cooperating with the guide arm (22) to measure the angular position of the guide arm (22) about the carrier axis (A).

14. Contour reading device according to claim 1, characterized in that the carrier arm (18) cooperates with axial drive means adapted to drive the movement of the feeler (8) in said direction parallel to the rotation axis of the turntable (6).

15. Contour reading device according to claim 14, characterized in that the axial drive means include an axial drive motor (31) adapted to move the carrier arm (18) along the carrier axis (A).

16. Contour reading device according to claim 15, characterized in that the axial drive motor (31) includes a pinion (32) meshing with a rack (33) fastened to a ring (20) attached to the carrier arm (18) and surrounding the carrier axis (A).

17. Contour reading device according to claim 15, characterized in that the axial drive motor (31) is adapted to position the carrier arm (18) along the carrier axis (A) in accordance with a varying set point.

18. Contour reading device according to claim 15, characterized in that the axial drive motor (31) is adapted to compensate the force of gravity.

19. Contour reading device according to claim 15 when directly or indirectly dependent on claim 5, characterized in that the axial drive motor (31) is mounted on the guide arm (22).

20. Contour reading device according to claim 1, characterized in that it further includes an encoder (31) cooperating with the carrier arm (18) to indicate the axial position of the carrier arm (18) along the carrier axis (A).

21. Contour reading device according to claim 1, characterized in that the carrier axis (A) is defined by a shaft (17) fixed perpendicularly to the surface of the turntable (6).

22. Contour reading device according to claim 21, characterized in that said shaft (17) has a prismatic cross section adapted to drive the carrier arm (18) in rotation about the carrier axis (A).

23. Contour reading device according to claim 1, characterized in that the feeler (8), the carrier axis (A) and the rotation axis of the turntable (6) are parallel.

24. Contour reading device according to claim 1, characterized in that the carrier arm (18) is centered on the carrier axis (A) by means of a ball bush (19) enabling movement in translation and rotation of the carrier arm (18) relative to the carrier axis (A).

* * * * *